(12) United States Patent
Kamimurai et al.

(10) Patent No.: US 10,673,362 B2
(45) Date of Patent: Jun. 2, 2020

(54) ELECTRIC POWER GENERATION CONTROL DEVICE OF ALTERNATING CURRENT GENERATOR FOR VEHICLES

(71) Applicant: Mitsubishi Electric Corporation, Tokyo (JP)

(72) Inventors: Akio Kamimurai, Tokyo (JP); Katsuyuki Sumimoto, Tokyo (JP)

(73) Assignee: Mitsubishi Electric Corporation, Chiyoda-ku, Tokyo (JP)

(*) Notice: Subject to any disclaimer, the term of this patent is extended or adjusted under 35 U.S.C. 154(b) by 293 days.

(21) Appl. No.: 15/638,659

(22) Filed: Jun. 30, 2017

(65) Prior Publication Data

US 2018/0262138 A1    Sep. 13, 2018

(30) Foreign Application Priority Data

Mar. 13, 2017  (JP) ................ 2017-047155

(51) Int. Cl.
| | |
|---|---|
| *H02P 9/00* | (2006.01) |
| *H02P 9/36* | (2006.01) |
| *H02P 9/44* | (2006.01) |
| *H02P 9/48* | (2006.01) |
| *H02P 9/02* | (2006.01) |
| *H02P 9/30* | (2006.01) |
| *F02N 11/00* | (2006.01) |

(52) U.S. Cl.
CPC ............ *H02P 9/006* (2013.01); *F02N 11/00* (2013.01); *H02P 9/02* (2013.01); *H02P 9/305* (2013.01); *H02P 9/36* (2013.01); *H02P 9/44* (2013.01); *H02P 9/48* (2013.01)

(58) Field of Classification Search
CPC ........................................... H02P 9/006
USPC ........................................... 307/10.1
See application file for complete search history.

(56) References Cited

U.S. PATENT DOCUMENTS

| | | | |
|---|---|---|---|
| 2004/0210805 A1 | 10/2004 | Kimelman et al. | |
| 2006/0059276 A1* | 3/2006 | Muth | H04L 12/40013 710/15 |
| 2006/0242501 A1 | 10/2006 | Kimelman et al. | |
| 2007/0085510 A1* | 4/2007 | Asada | H02P 9/02 322/28 |
| 2014/0292285 A1* | 10/2014 | Kadric | H02P 9/10 322/28 |
| 2015/0295528 A1* | 10/2015 | Seidl | H03M 5/16 322/89 |
| 2016/0373040 A1* | 12/2016 | Auer | B60L 50/15 |
| 2017/0005650 A1* | 1/2017 | Shuvalov | H04L 12/46 |

(Continued)

FOREIGN PATENT DOCUMENTS

| | | |
|---|---|---|
| JP | 1-209754 A | 8/1989 |
| JP | 3-033666 A | 2/1991 |
| JP | 2006-514296 A | 4/2006 |

*Primary Examiner* — Adi Amrany
(74) *Attorney, Agent, or Firm* — Sughrue Mion, PLLC; Richard C. Turner

(57) ABSTRACT

A P terminal that is connected to an armature coil, an LIN terminal for LIN communications, and an interface circuit are provided, and the interface circuit converts serial signals which are input from the P terminal and the LIN terminal into parallel signals and transmits scan test signals input from the P terminal and the LIN terminal to a digital circuit and transmits a scan test signal output from the digital circuit to the LIN terminal.

10 Claims, 5 Drawing Sheets

(56) References Cited

U.S. PATENT DOCUMENTS

2017/0077853 A1* 3/2017 Zook .................... H02P 9/48
2018/0041150 A1* 2/2018 Graefling ............... H02P 9/04

* cited by examiner

PRIOR ART

ELECTRIC POWER GENERATION CONTROL DEVICE OF ALTERNATING CURRENT GENERATOR FOR VEHICLES

BACKGROUND OF THE INVENTION

1. Field of the Invention

This invention relates to electric power generation control devices of alternating-current generators for vehicles and, in particular, relates to an electric power generation control device of an alternating-current generator for vehicles, that can carry out a scan test on a digital circuit in a packaged state.

2. Description of the Related Art

An electric power generation control device of an alternating-current generator for vehicles is usually configured with a semiconductor integrated circuit including a circuit that monitors a battery voltage and adjusts an exciting current to be supplied to a field coil so that a target set voltage is obtained. In a package 10 of an electric power generation control device provided with a local interconnect network (LIN) communications interface as depicted in FIG. 5, for example, the number of package terminals of this electric power generation control device is five: a B terminal to which a battery is connected, an E terminal to which a ground is connected, an F terminal that supplies the exciting current to the field coil, an input terminal (hereinafter, a P terminal) that is connected to an armature coil of the alternating-current generator for vehicles, the input terminal to which a phase voltage signal is input, and a communications terminal (hereinafter, an LIN terminal) for LIN communications. As the terminal to which the phase voltage signal is input, two terminals: a P1 terminal and a P2 terminal are sometimes provided.

The electric power generation control device of the alternating-current generator for vehicles includes a digital circuit that implements an analog circuit control function, a communications function, and so forth. As a technique of diagnosing a failure of this digital circuit, a technique called a scan test is known. A scan test requires, for test data communications, at least 5 terminals that input or output signals: SCAN_RST which is a signal for resetting a circuit at the time of a scan, SCAN_EN which is a signal for enabling a scan circuit, SCAN_IN which is data on a shift register for a scan path, SCAN_CLK which is a clock signal for shift operation, and SCAN_OUT which is an output signal for observation. However, in the package 10, whose number of terminals is limited, of the electric power generation control device as depicted in FIG. 5, it is impossible to allocate a terminal for a scan test, which makes it impossible to carry out a scan test in a packaged state.

Moreover, in the electric power generation control device provided with the LIN communications interface, it is possible to send and receive data via LIN communications; however, since the LIN communications function implemented in the digital circuit is disabled at the time of a scan test, it is impossible to send and receive data during a scan test by using LIN communications.

Increasing the number of package terminals for a scan test makes it possible to carry out a scan test, but an increase in the number of package terminals undesirably increases costs.

To inspect the function of the digital circuit in the electric power generation control device in a packaged state, it is necessary to carry out an inspection, not by a scan test, but by operating a circuit function. This arises a problem of, for example, a long inspection time or a low failure detection rate. A scan test is effective as a technique of determining, when a failure occurs in a produced LSI, whether or not the failure has occurred in the digital circuit; however, in order to carry out a scan test, it is necessary to open a package to take an LSI out of the package and reimplement the LSI in a package that allows wire bonding to be performed also on a scan test terminal.

As an existing technique of this kind, JP-A-03-033666 (Patent Document 1), for example, discloses a configuration in which the number of dedicated test terminals is reduced from three, as in an existing example, to two by making one of the input terminals double as a scan mode control (SMC) terminal in a logic integrated circuit provided with a test terminal for a scan path.

Moreover, for example, JP-T-2006-514296 (Patent Document 2) discloses, as a communications interface for a diagnostic circuit of an integrated circuit, a configuration using a bi-directional serial signal and a signal format including a plurality of time slots.

Furthermore, for example, JP-A-01-209754 (Patent Document 3) discloses a configuration that uses an external pin while switching between an external pin for data signal input and an external pin for control signal input by measuring the degree of change in the logic of an input signal from the external pin and thereby reduces the number of external pins.

[Patent Document 1] JP-A-03-033666 (page 2, lower left column, line 10 to page 2, lower right column, line 17, FIG. 1)

[Patent Document 2] JP-T-2006-514296 (paragraphs 0019 and 0022, FIGS. 1 and 2)

[Patent Document 3] JP-A-01-209754 (page 3, upper left column, line 4 to page 3, lower right column, line 4, FIG. 2)

As described above, in the electric power generation control device of the alternating-current generator for vehicles, a scan test on the digital circuit cannot be carried out in a packaged state due to the restrictions on the number of package terminals, which increases the amount of time to inspect the digital circuit and arises a problem of a low failure detection rate. Furthermore, when a failure occurs in a produced LSI, it is difficult to determine whether or not the failure is a failure of the digital circuit.

SUMMARY OF THE INVENTION

This invention has been made to solve the above-described problems and an object thereof is to provide an electric power generation control device of an alternating-current generator for vehicles, that can carry out a scan test on a digital circuit in a packaged state.

To attain the above-described object, an electric power generation control device of an alternating-current generator for vehicles according to this invention includes: an input terminal that is connected to an armature coil of the alternating-current generator for vehicles; a communications terminal for LIN communications; and an interface circuit that is connected to the input terminal and the communications terminal and converts serial signals which are input from the input terminal and the communications terminal into parallel signals, and the electric power generation control device enables a scan test to be carried out in a packaged state by transmitting scan test signals input from the input terminal and the communications terminal to a digital circuit and transmitting a scan test signal output from the digital circuit to the communications terminal.

With the electric power generation control device of the alternating-current generator for vehicles according to this invention, even when the electric power generation control device of the alternating-current generator for vehicles is in a packaged state, since it is possible to carry out a scan test which is a technique of diagnosing a failure of the digital circuit, it is possible to reduce the amount of time to inspect the digital circuit by a scan test and increase the failure detection rate. Moreover, when a failure occurs after production, it is easy to make a determination as to whether or not the failure is a failure of the digital circuit.

The foregoing and other objects, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
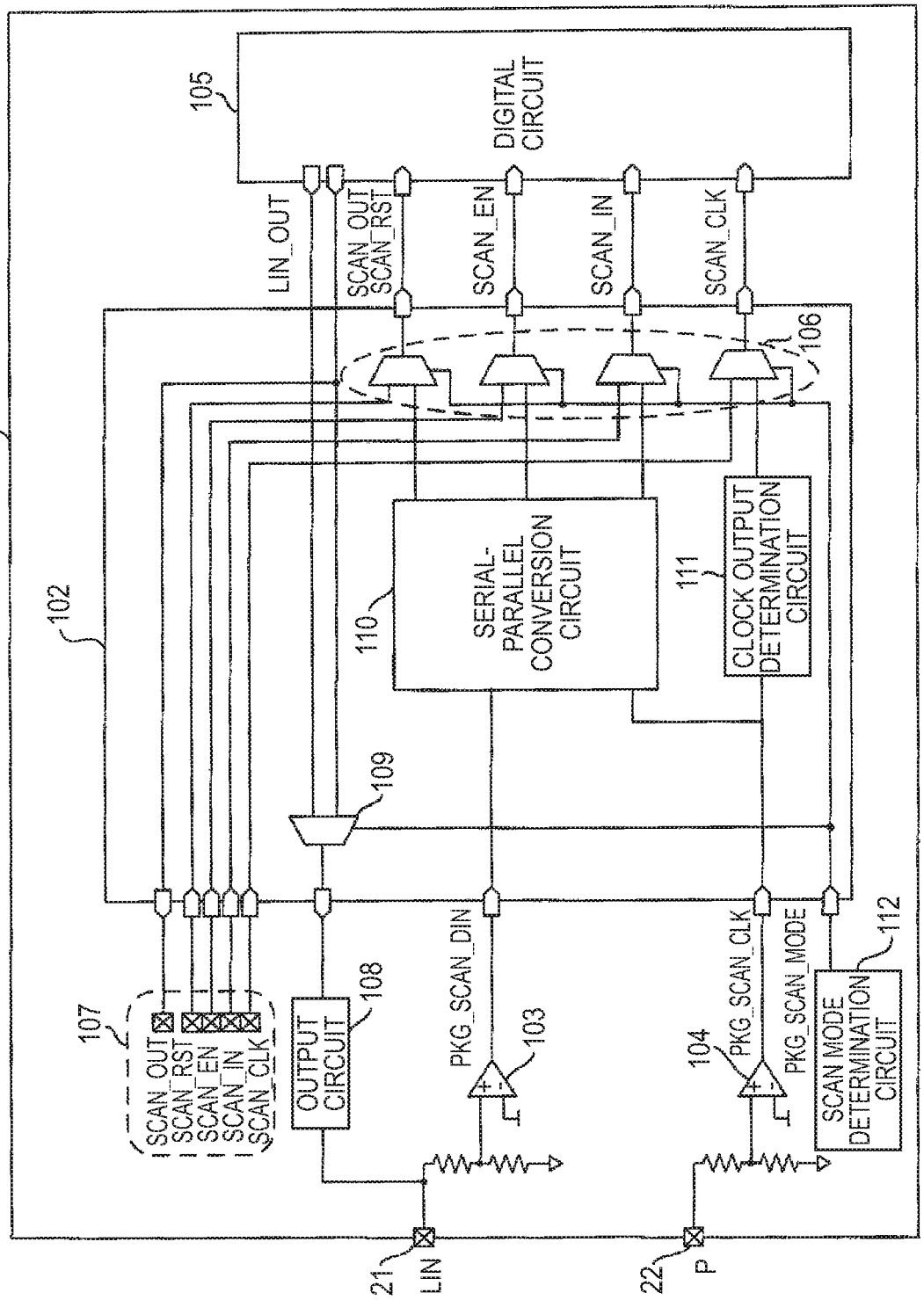
FIG. 1 is a diagram depicting the configuration of an electric power generation control device of an alternating-current generator for vehicles according to a first embodiment of this invention.

Hereinafter, preferred embodiments of an electric power generation control device of an alternating-current generator for vehicles according to this invention will be described with reference to the drawings. It is to be noted that, in the drawings, portions identified with the same numeral are the same or corresponding portions.

First Embodiment

FIG. 1 is a diagram depicting the configuration of an electric power generation control device of an alternating-current generator for vehicles according to a first embodiment of this invention. In FIG. 1, an electric power generation control device 101 includes an LIN terminal 21 and a P terminal 22, which are mentioned above, and an interface circuit 102. To the LIN terminal 21, as data for a scan test, signals: SCAN_RST which is a signal for resetting a circuit at the time of a scan, SCAN_EN which is a signal for enabling a scan circuit, and SCAN_IN which is data on a shift register for a scan path are input, and, to the P terminal 22, a SCAN_CLK signal which is a clock signal for shift operation is input. The input signals are subjected to resistance voltage dividing and then waveform shaping by comparators 103 and 104 and are input to the interface circuit 102.

The interface circuit 102 converts serial signals for a scan test input from the LIN terminal 21 and the P terminal 22 into parallel signals to transmit the signals to a digital circuit 105. At the time of a scan test in a packaged state, the parallel signals obtained by conversion and the SCAN_CLK signal input from the P terminal 22 are input to the digital circuit 105 via a first multiplexer 106. When signals for a scan test are input from a scan test terminal 107, the signals input from the scan test terminal 107 are input to the digital circuit 105 by the first multiplexer 106.

A SCAN_OUT signal which is an output signal for observation output from the digital circuit 105 is output to an output circuit 108 via the interface circuit 102 and output from the LIN terminal 21. At the time of normal operation, an LIN communications signal is output by a second multiplexer 109.

The LIN terminal 21 and the P terminal 22 include, as the original function of the electric power generation control device, comparators that make input signals subjected to resistance voltage dividing and waveform shaping to obtain digital signals. Thus, the comparators 103 and 104 that make the signals for a scan test subjected to waveform shaping can double as the above-described comparators, and allocating the LIN terminal 21 and the P terminal 22 as terminals to which scan test signals are input offers the advantage of eliminating the need for an additional circuit.

Moreover, since the LIN terminal 21 includes an output circuit as the original function of the electric power generation control device, the output circuit 108 that outputs the SCAN_OUT signal can double as the output circuit of the above-described LIN terminal 21. Thus, allocating the LIN terminal 21 as a terminal from which the SCAN_OUT signal is output offers the advantage of eliminating the need for an additional circuit.

The interface circuit 102 includes a serial-parallel conversion circuit 110, the first multiplexer 106 that makes a selection from among the signals which are input and output to and from the scan test terminal 107, the second multiplexer 109, and a clock output determination circuit 111 that determines whether or not the SCAN_CLK signal is output to the digital circuit 105.

The serial-parallel conversion circuit 110 includes shift registers, one for each of the signals: SCAN_RST, SCAN_EN, and SCAN_IN which are input from the LIN terminal 21 and sequentially stores data of the set number of bits in the shift registers. While storing the values in the shift registers, the serial-parallel conversion circuit 110 makes the clock output determination circuit 111 mask the SCAN_CLK signal so that the SCAN_CLK signal is not output to the digital circuit 105. When receiving all the data of the signals, the serial-parallel conversion circuit 110 outputs, from the next clock, the values stored in the shift registers to the digital circuit 105 along with the SCAN_CLK signal. A numeral 112 denotes a scan mode determination circuit. The scan mode determination circuit 112 is a circuit that detects a predetermined signal pattern which is not input during the normal operation and switches the digital circuit 105 to a scan test mode.

Figure 2:
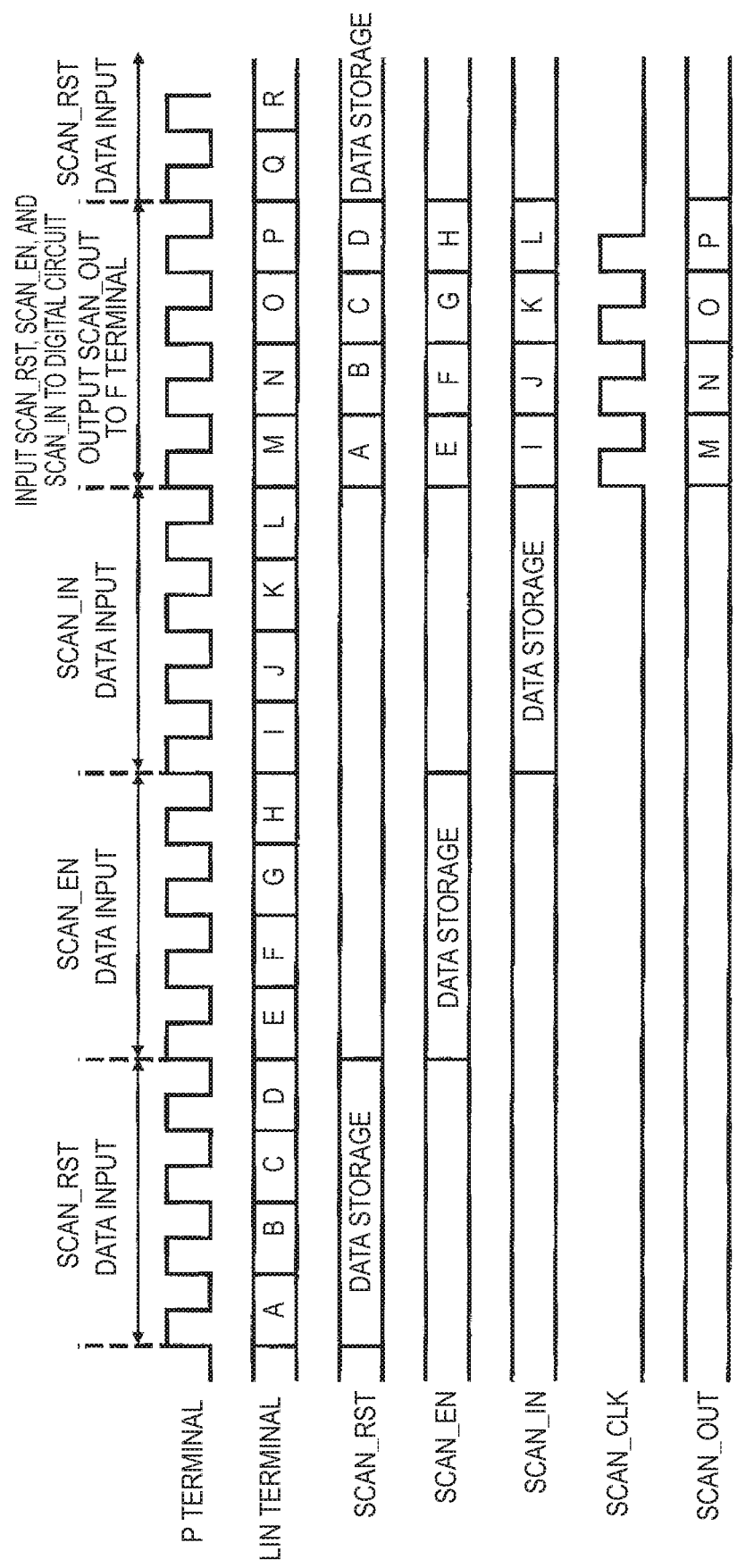
FIG. 2 is a diagram depicting a timing chart which is observed when operation is performed every 4 bits in the electric power generation control device of the alternating-current generator for vehicles according to the first embodiment of this invention.

FIG. 2 is a diagram depicting a timing chart of the interface circuit 102 and illustrates a case in which the serial-parallel conversion circuit 110 includes the 4-bit shift registers.

In FIG. 2, A to R denote signals indicating High and Low. The serial signals input from the LIN terminal 21 are stored in order in the shift registers in the serial-parallel conversion circuit 110 for every 4 bits. During this period, the clock signal of the P terminal 22 is used as a clock of the shift registers. Upon completion of storage of signals of 12 bits, the interface circuit 102 outputs the values stored in the shift registers to the digital circuit 105 in order in the next 4 clocks. In so doing, the interface circuit 102 outputs the clock of the P terminal 22 to the digital circuit 105 as the SCAN_CLK signal via the clock output determination circuit 111. The SCAN_OUT signal output from the digital circuit 105 is output from the LIN terminal 21 via the interface circuit 102. Scan data is sent and received for every 4 bits by repetition of the above operation, whereby a scan test is carried out.

Next, a technique of switching the mode to the scan test mode in a packaged state will be described. In order to carry out a scan test, it is necessary to switch the digital circuit 105 to the scan test mode. A feature of the electric power generation control device according to the first embodiment is that, as an alternator, when receiving a signal that is not input in the normal operation, the electric power generation control device switches the mode to the scan test mode in a packaged state.

An example of the technique of switching the mode to the scan test mode is inputting a frequency which is higher than the frequency of the phase voltage signal that is normally input to the P terminal 22, which makes it possible to switch the mode to the scan test mode. Since the frequency of the phase voltage signal is normally 4000 Hz or lower, a signal of a frequency higher than 4000 Hz is input to perform switching to the scan test mode in a packaged state.

Figure 5:
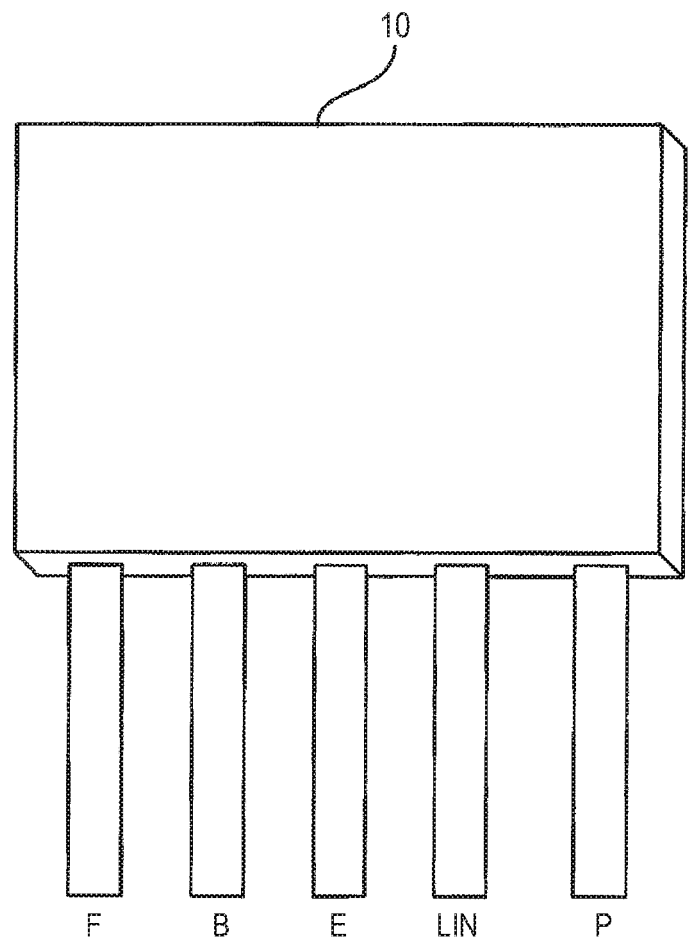
FIG. 5 is a diagram depicting a package of an electric power generation control device of an alternating-current generator for vehicles.

As another example of the technique of switching the mode to the scan test mode is inputting a signal to the F terminal of a package 10 (see FIG. 5), which makes it possible to switch the mode to the scan test mode. The F terminal is an output terminal at the time of normal operation. A signal is input to the F terminal from the outside and, if the frequency thereof is higher than a predetermined frequency, switching to the scan test mode in a packaged state is performed.

As described above, with the electric power generation control device of the alternating-current generator for vehicles according to the first embodiment, even when the electric power generation control device of the alternating-current generator for vehicles is in a packaged state, it is possible to carry out a scan test which is a technique of diagnosing a failure of the digital circuit 105, which makes it possible to reduce the amount of time to inspect the digital circuit 105 by a scan test and increase the failure detection rate. Moreover, when a failure occurs after production, it is easy to make a determination as to whether or not the failure is a failure of the digital circuit 105.

Second Embodiment

Next, an electric power generation control device of an alternating-current generator for vehicles according to a second embodiment of this invention will be described.

Figure 3:
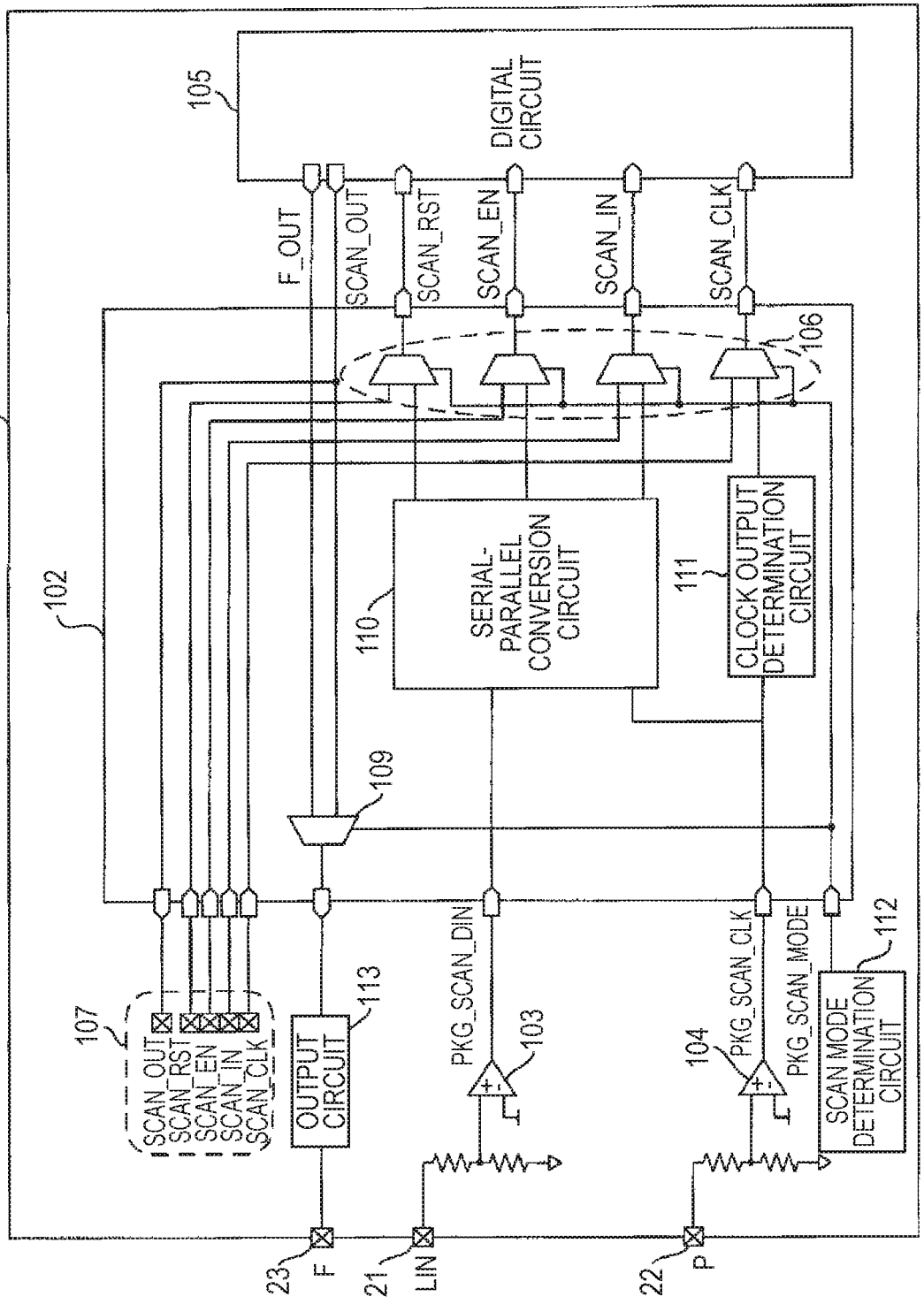
FIG. 3 is a diagram depicting the configuration of an electric power generation control device of an alternating-current generator for vehicles according to a second embodiment of this invention.

FIG. 3 is a diagram depicting the configuration of the electric power generation control device of the alternating-current generator for vehicles according to the second embodiment. In FIG. 3, an electric power generation control device 101 includes an LIN terminal 21, a P terminal 22, an F terminal 23, and an interface circuit 102. Unlike the first embodiment, a feature of the electric power generation control device of the alternating-current generator for vehicles according to the second embodiment is that the F terminal 23 is used as a terminal from which the SCAN_OUT signal is output. This offers the advantage of eliminating the need for the input-output switching control of the LIN terminal 21 and simplifying the control circuit. The portions other than those described above are the same as those of the first embodiment and therefore identified with the same numerals, and their detailed explanations will be omitted.

Since the F terminal 23 includes an output circuit as the original function of the electric power generation control device, an output circuit 113 that outputs the SCAN_OUT signal can double as the output circuit of the existing F terminal. Therefore, allocating the LIN terminal 21 as a terminal from which the SCAN_OUT signal is output offers the advantage of eliminating the need for an additional circuit.

Figure 4:
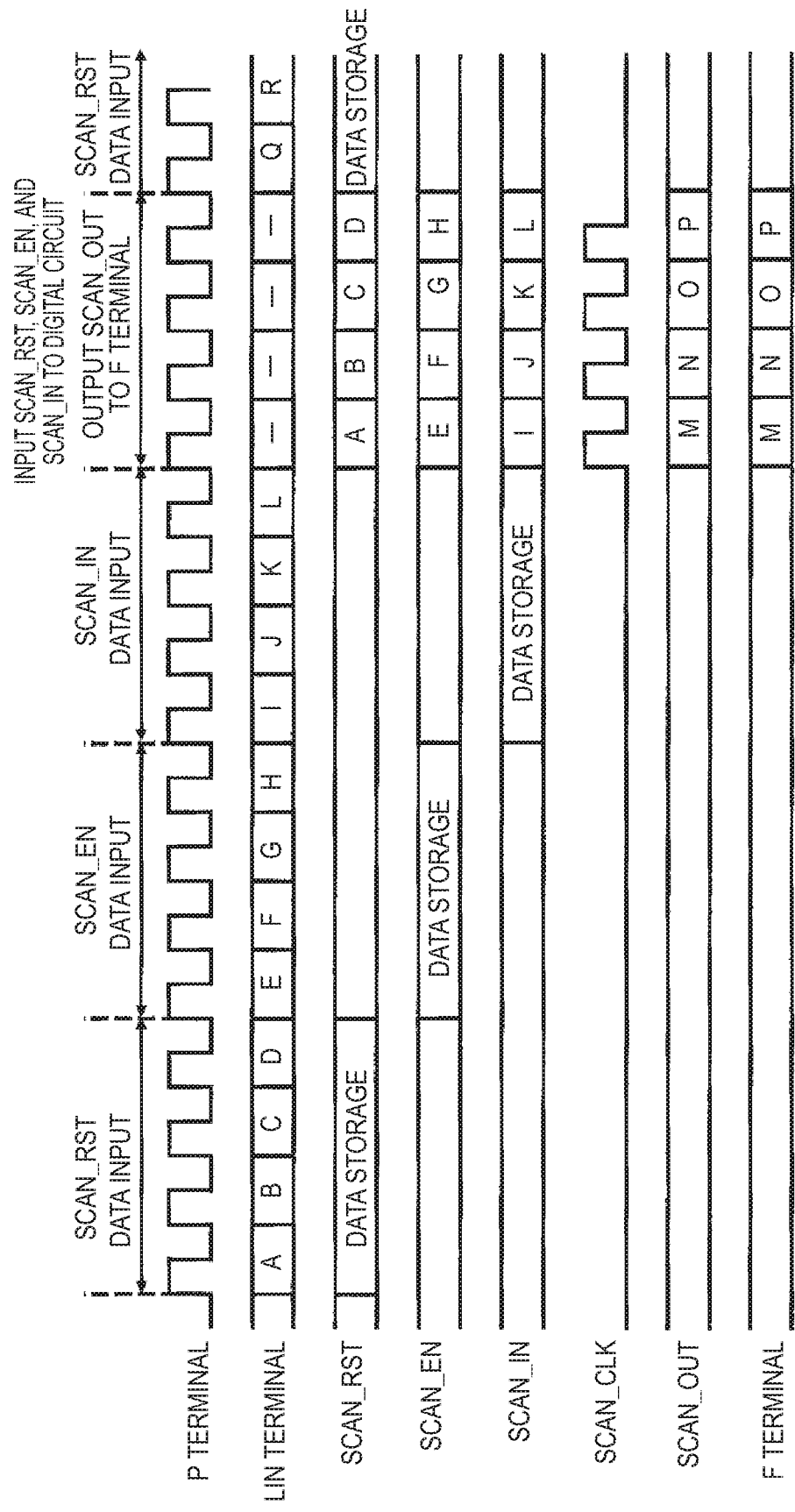
FIG. 4 is a diagram depicting a timing chart which is observed when operation is performed every 4 bits in the electric power generation control device of the alternating-current generator for vehicles according to the second embodiment of this invention.

FIG. 4 is a diagram depicting a timing chart of the interface circuit 102 according to the second embodiment, the timing chart which is observed when a serial-parallel conversion circuit 110 includes the 4-bit shift registers. In the timing chart of FIG. 4, the SCAN_OUT signal is output from the F terminal 23.

With the electric power generation control device of the alternating-current generator for vehicles according to the second embodiment, it is possible to obtain the same effects as those of the electric power generation control device of the alternating-current generator for vehicles according to the first embodiment. In addition thereto, the use of the F terminal 23 as a terminal from which the SCAN_OUT signal is output offers the advantage of eliminating the need for the input-output switching control of the LIN terminal 21 and simplifying the control circuit.

Various modifications and alterations of this invention will be apparent to those skilled in the art without departing from the scope and spirit of this invention, and it should be understood that this is not limited to the illustrative embodiments set forth herein.

What is claimed is:

1. An electric power generation control device of an alternating-current generator for vehicles, comprising:
   an input terminal that is connected to an armature coil of the alternating-current generator for vehicles;
   a local interconnect network (LIN) terminal for LIN communications; and
   an interface circuit that is connected to the input terminal and the LIN terminal and converts serial signals which are input from the input terminal and the LIN terminal into parallel signals,
   wherein
   the electric power generation control device enables a scan test to be carried out in a packaged state by transmitting scan test signals input from the input terminal and the LIN terminal to a digital circuit and transmitting a scan test signal output from the digital circuit to the LIN terminal.

2. The electric power generation control device of the alternating-current generator for vehicles according to claim 1, wherein
   the LIN terminal receives a signal for resetting a circuit at a time of a scan, a signal for enabling a scan circuit, and data on a shift register for a scan path,
   the input terminal receives a clock signal for shift operation, the interface circuit converts the signal for resetting into the circuit, the signal for enabling the scan circuit, the data on the shift register, to the parallel signals, and the LIN terminal outputs an output signal for observation.

3. The electric power generation control device of the alternating-current generator for vehicles according to claim 1, wherein the electric power generation control device enables the scan test to be carried out in the packaged state by transmitting the scan test signal which is output from the digital circuit to an output terminal to which a field coil of the alternating-current generator for vehicles is connected.

4. The electric power generation control device of the alternating-current generator for vehicles according to claim 3, wherein the scan test signal which is output from the output terminal is an output signal for observation.

5. The electric power generation control device of the alternating-current generator for vehicles according to claim 3, wherein the electric power generation control device switches the digital circuit to a scan test mode in the packaged state in response to determining that a frequency of an input signal to the output terminal is equal to or higher than a predetermined frequency.

6. The electric power generation control device of the alternating-current generator for vehicles according to claim 1, wherein the electric power generation control device detects a predetermined signal pattern that is not input during normal operation and switches the digital circuit to a scan test mode in the packaged state.

7. The electric power generation control device of the alternating-current generator for vehicles according to claim 1, wherein the electric power generation control device detects an input of a signal of a frequency equal to or higher than a predetermined frequency to the input terminal and switches the digital circuit to a scan test mode in the packaged state.

8. The electric power generation control device of the alternating-current generator for vehicles according to claim 1, wherein the interface circuit is configured to:

sequentially receive and store the serial signals that are input from the LIN terminal;

upon receiving a clock signal, multiplex different portions of the serial signals with different scan signals to generate and output the parallel signals.

9. The electric power generation control device of the alternating-current generator for vehicles according to claim 8, wherein the interface circuit is further configured to:

sequentially receive the different scan signals from a scan test terminal while the serial signals are received from the LIN terminal; and hold off outputting the stored serial signals as the parallel signals until the clock signal is received.

10. The electric power generation control device of the alternating-current generator for vehicles according to claim 8, wherein the different scan signals comprise a signal for a circuit at a time of a scan, a signal for enabling a scan circuit, and data on a shift register for a scan path.

* * * * *